United States Patent

Holmquist et al.

[11] Patent Number: 5,326,001
[45] Date of Patent: Jul. 5, 1994

[54] PAINT APPLICATOR SYRINGE

[76] Inventors: Kimberly K. Holmquist, Box 393, Leach Hill Rd., Kennedy, N.Y. 14747; Martin Hand, 550 Kiantone Rd., Jamestown, N.Y. 14701

[21] Appl. No.: 65,379
[22] Filed: May 24, 1993
[51] Int. Cl.$^5$ .............................................. G01F 11/00
[52] U.S. Cl. ...................................... 222/387; 222/556
[58] Field of Search ............... 239/319, 320, 379, 375; 222/511, 517, 556, 386, 387

[56] References Cited

U.S. PATENT DOCUMENTS

| | | | |
|---|---|---|---|
| 1,119,033 | 12/1914 | Paddock | 222/387 X |
| 1,151,254 | 8/1915 | Enghauser | 239/379 X |
| 1,846,167 | 2/1932 | Wallen | 222/387 X |
| 2,305,269 | 12/1942 | Moreland | 239/379 X |
| 2,789,011 | 4/1957 | Gebauer | 239/379 X |
| 3,291,128 | 12/1966 | O'Neil | 222/386 X |
| 3,572,556 | 3/1971 | Pagacar | 222/386 X |
| 4,090,646 | 5/1978 | Dubiel et al. | 222/387 X |
| 4,344,573 | 8/1982 | De Felice | 239/320 |
| 4,344,577 | 8/1982 | Gilson et al. | 239/39 X |

FOREIGN PATENT DOCUMENTS

| | | | |
|---|---|---|---|
| 374953 | 9/1921 | Fed. Rep. of Germany | 239/329 |
| 699700 | 11/1940 | Fed. Rep. of Germany | 222/556 |
| 2461377 | 7/1975 | Fed. Rep. of Germany | 239/319 |
| 597965 | 3/1978 | U.S.S.R. | 222/387 |

Primary Examiner—Andres Kashnikow
Assistant Examiner—Kevin P. Weldon
Attorney, Agent, or Firm—E. Michael Combs

[57] ABSTRACT

A syringe structure is arranged for use in application of a stream of paint onto a support surface for use by artisans and the like in application of a viscous paint fluid onto various surfaces. The syringe structure includes a tubular body and plunger, with a forwardmost end of the tubular body including removably mounted applicator tips of various sizes.

1 Claim, 4 Drawing Sheets

PAINT APPLICATOR SYRINGE

BACKGROUND OF THE INVENTION

1. Field of the Invention

The field of invention relates to paint application structure, and more particularly pertains to a new and improved paint applicator syringe wherein the same is directed for the use of various sized tips removable mounted relative to a body for application of various sizes of paint streams onto a support surface.

2. Description of the Prior Art

Syringe structure of various types are utilized in the prior art and typically, syringes are of a medical utilization such as indicated in U.S. Pat. Nos. 4,484,915; 4,533,962; 4,650,468.

The instant invention attempts to overcome deficiencies of the prior art by providing for a syringe structure particularly directed to the application of a viscous fluid through variously sized nozzles and in this respect, the present invention substantially fulfills this need.

SUMMARY OF THE INVENTION

In view of the foregoing disadvantages inherent in the known types of syringe apparatus now present in the prior art, the present invention provides a paint applicator syringe wherein the same is directed for the employment of various nozzles relative to a tubular body. As such, the general purpose of the present invention, which will be described subsequently in greater detail, is to provide a new and improved paint applicator syringe which has all the advantages of the prior art syringe apparatus and none of the disadvantages.

To attain this, the present invention provides a syringe structure arranged for use in application of a stream of paint onto a support surface for use by artisans and the like in application of a viscous painted fluid onto various surfaces. The syringe structure includes a tubular body and plunger, with a forward most end of the tubular body including removably mounted applicator tips of various sizes.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved paint applicator syringe which has all the advantages of the prior art syringe apparatus and none of the disadvantages.

It is another object of the present invention to provide a new and improved paint applicator syringe which may be easily and efficiently manufactured and marketed.

It is a further object of the present invention to provide a new and improved paint applicator syringe which is of a durable and reliable construction.

An even further object of the present invention is to provide a new and improved paint applicator syringe which is susceptible of a low cost of manufacture with regard to both materials and labor, and which accordingly is then susceptible of low prices of sale to the consuming public, thereby making such paint applicator syringes economically available to the buying public.

Still yet another object of the present invention is to provide a new and improved paint applicator syringe which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
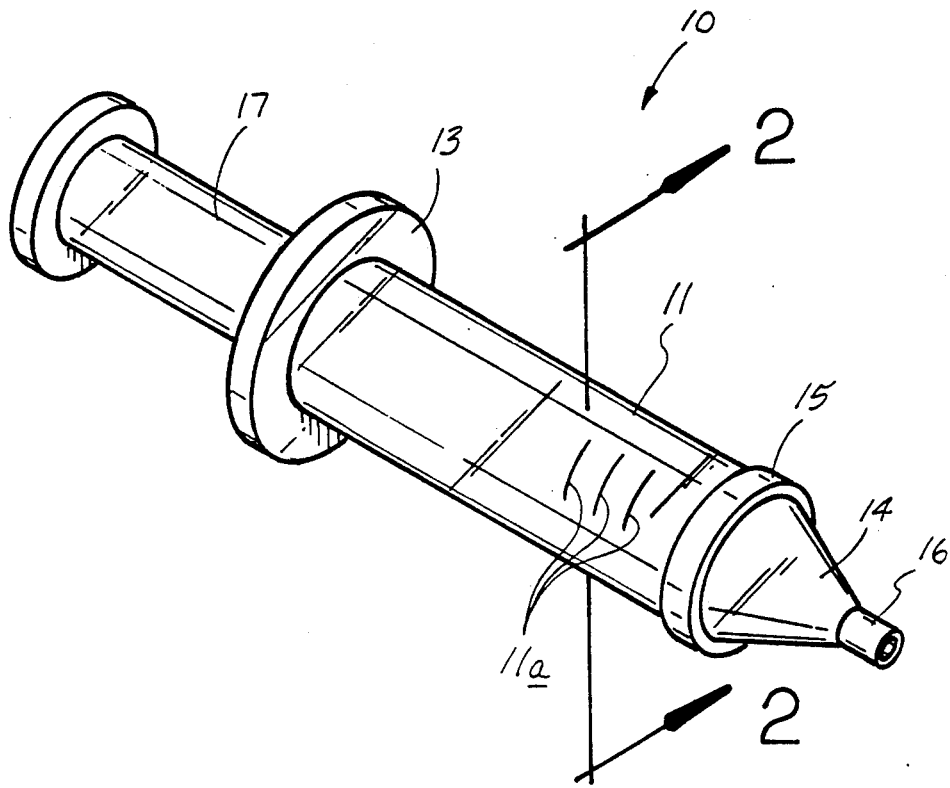
FIG. 1 is an isometric illustration of the invention.
Figure 2:
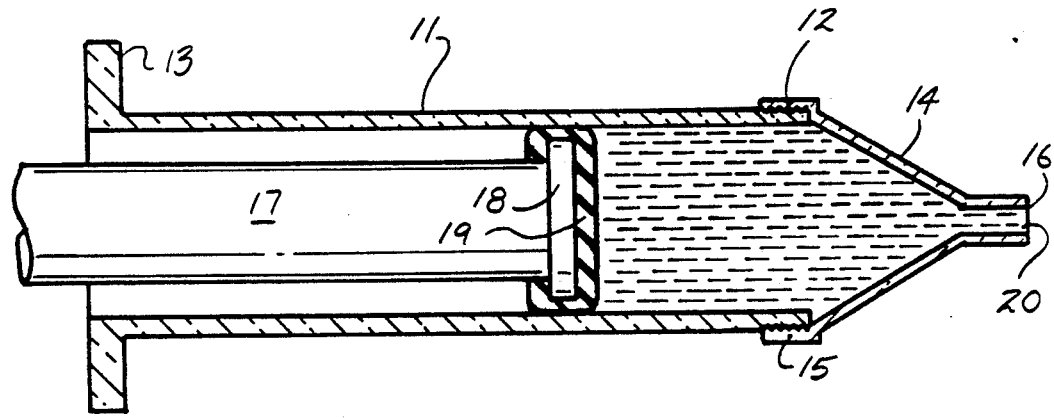
FIG. 2 is an orthographic view, taken along the lines 2—2 of FIG. 1 in the direction indicated by the arrows.
Figure 3:
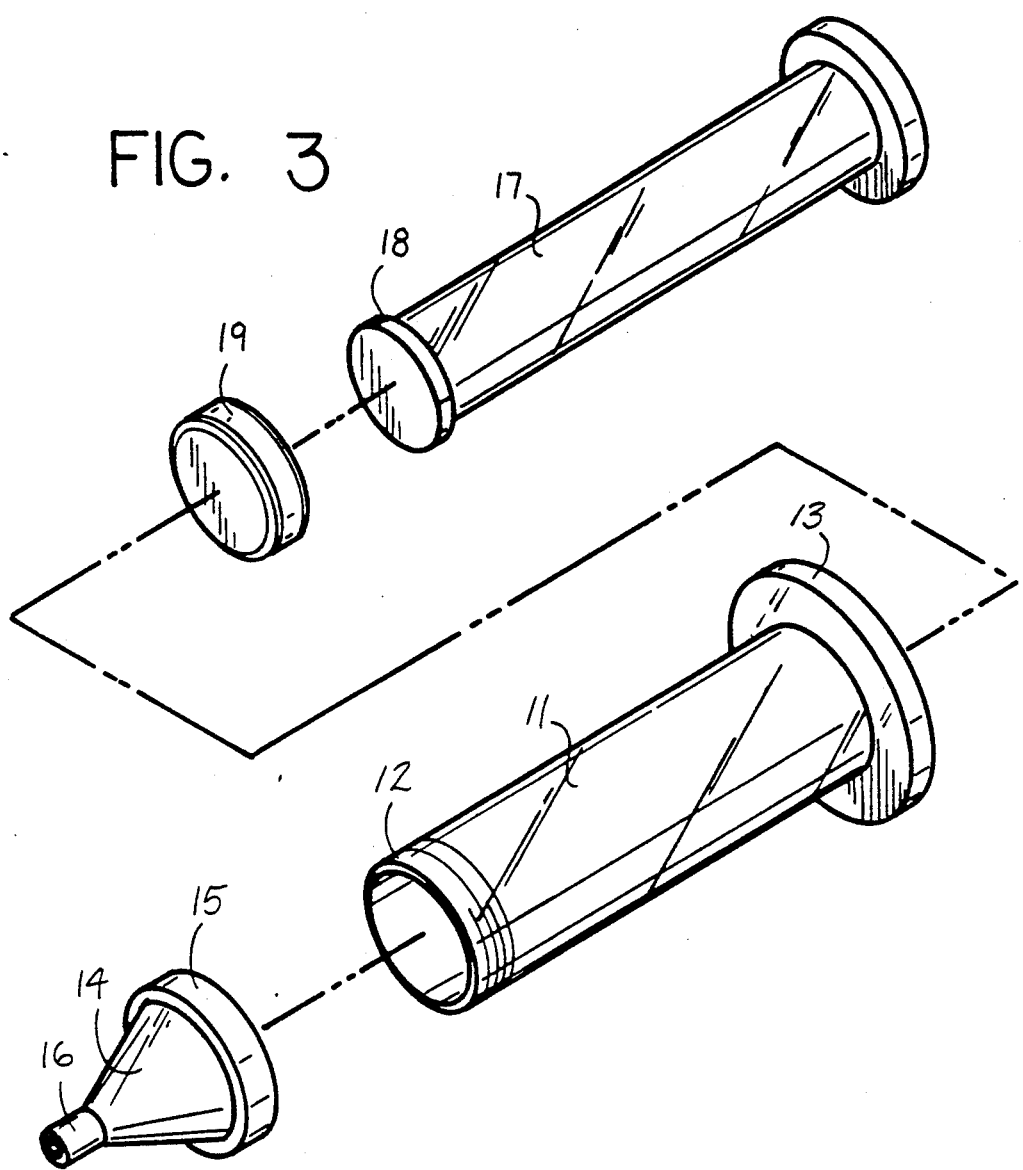
FIG. 3 is an isometric enlarged illustration of the invention in an exploded view to illustrate the various components thereof.
Figure 4:
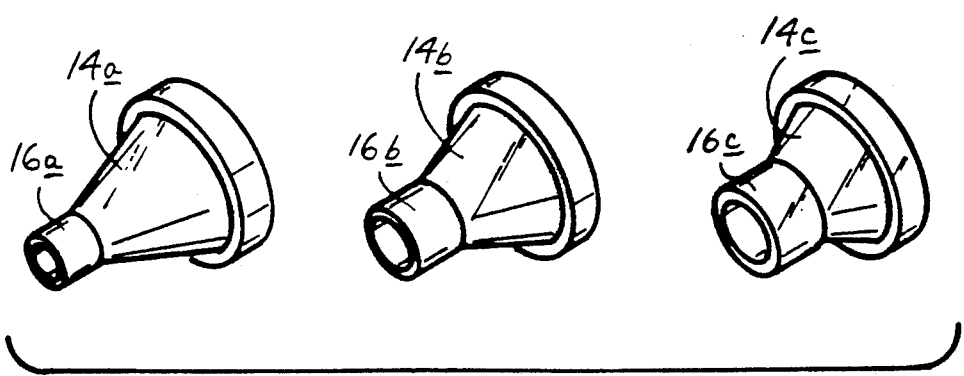
FIG. 4 is an isometric illustration of a plurality of tip members for use by the tubular body of the invention.

With reference now to the drawings, and in particular to FIGS. 1 to 8 thereof, a new and improved paint applicator syringe embodying the principles and concepts of the present invention and generally designated by the reference numerals 10 and 10a will be described.

More specifically, the paint applicator syringe 10 of the instant invention essentially comprises a tubular body 11 arranged to optionally employ spaced gradations 11a to an exterior surface thereof, as the tubular body 11 is typically formed of a transparent material. An externally threaded first portion 12 of the tubular body is spaced from an annular flange 13 at a second end portion of the tubular body 11. A conical head 14 is provided, having an internally threaded skirt 15 arranged for securement to the externally threaded first end portion 12. The conical head 14 terminates in an outlet tube 16. Typically, a plurality of such conical heads 14, 14a, 14b, and 14c are provided, having variously sized outlet tubes 16, 16a, 16b, and 16c of increasing outlet openings 20. In this manner, the plunger rod 17 mounting a piston 18 within the tubular body 11 is oriented between the first end portion and the second end portion, with the piston 18 having a piston seal 19 of a generally cylindrical configuration mounted to the piston head in a facing relationship relative to the conical head 14 to express a viscous fluid from within the tubular body between the seal 19 and the conical head 14.

Figure 5:
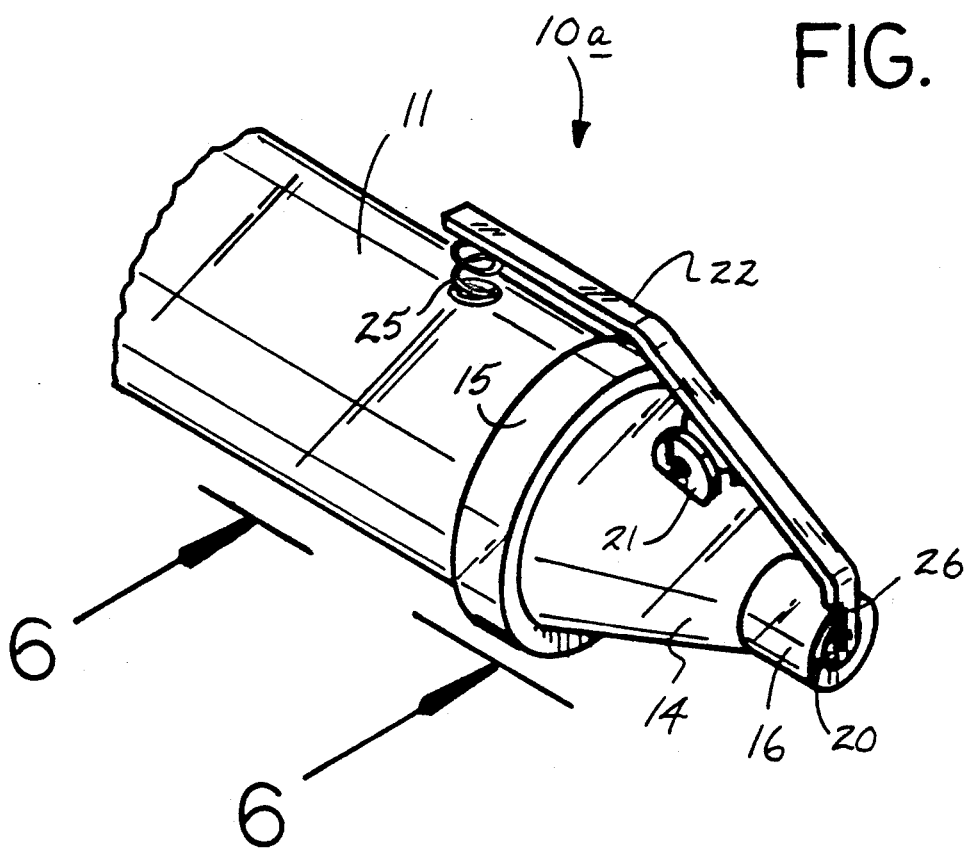
FIG. 5 is an indication of a modified tip structure relative to the tubular body.
Figure 6:
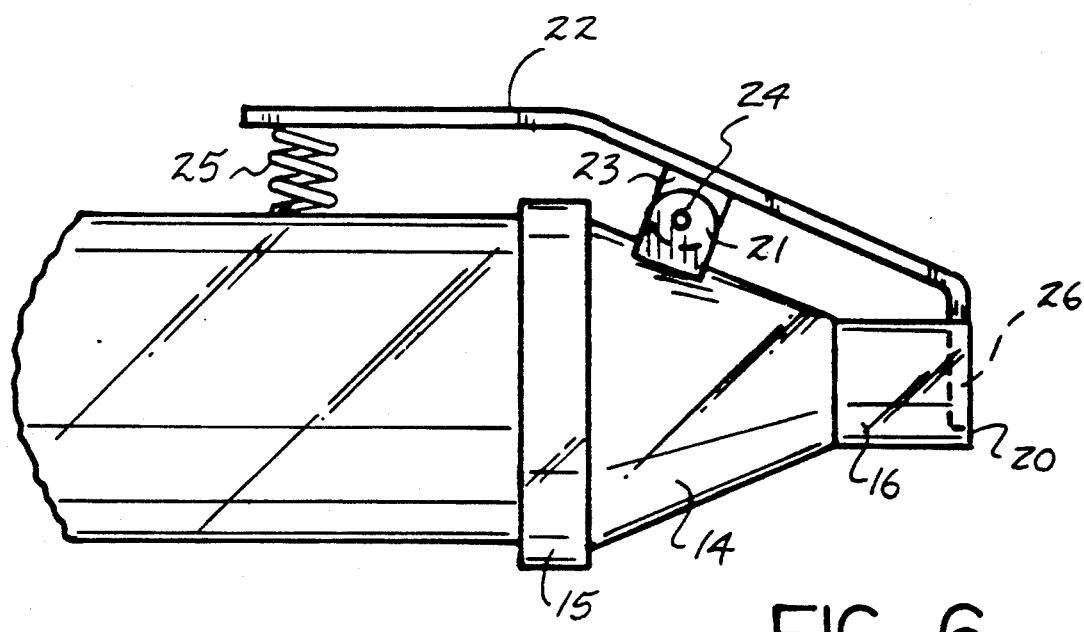
FIG. 6 is an orthographic view, taken along the lines 6—6 of FIG. 5 in the direction indicated by the arrows.
Figure 7:
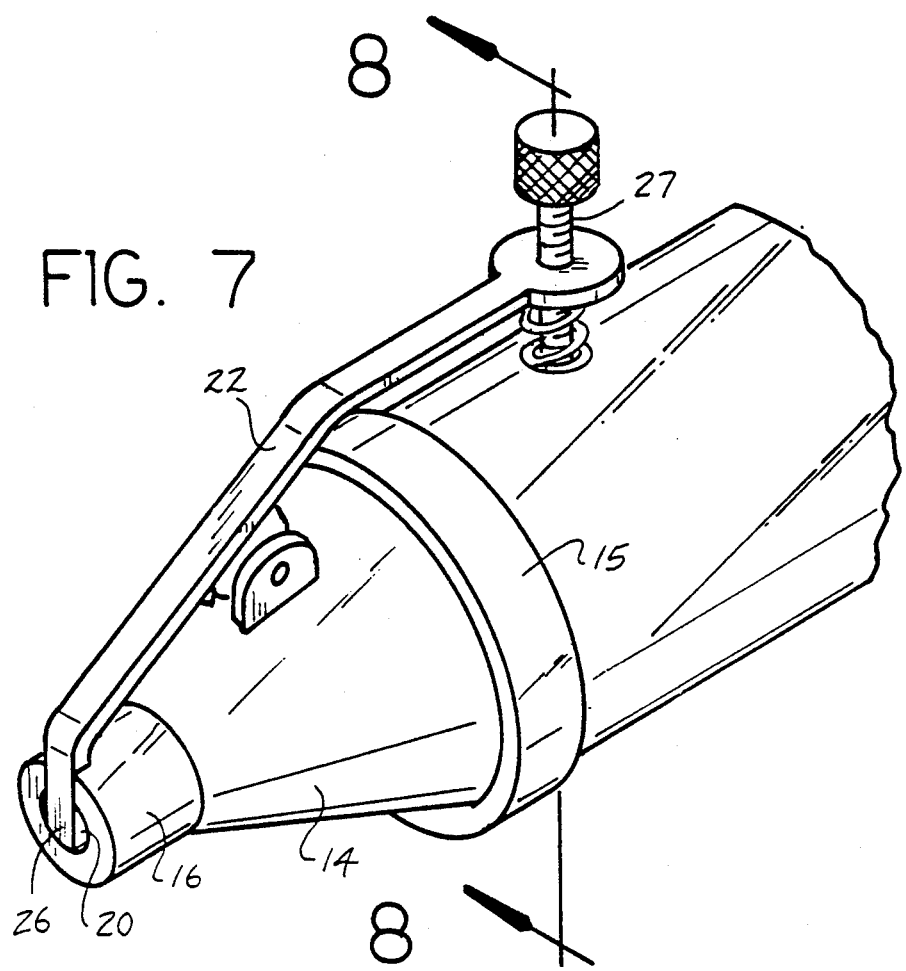
FIG. 7 is an isometric illustration of a further modified lever structure for use by the applicator tip.

The syringe 10a, as indicated in FIG. 5, is arranged to include a bifurcated mount 21 mounted to the conical head 14. The bifurcated mount 21 is arranged to receive an actuator lever lug 23 fixedly mounted intermediate an actuator lever 22. The actuator lever 22 includes an axle 24 directed through the lug 23 and the bifurcated mount 21. A lever spring 25 is oriented at a first end of the actuator lever 22 between the first end of the actuator lever 22 and the tubular body 11. A metering flange 26 is mounted at a second end of the actuator lever 22 to extend over the exit opening 20 to provide for selective metering of the viscous fluid through the opening 20.

Figure 8:
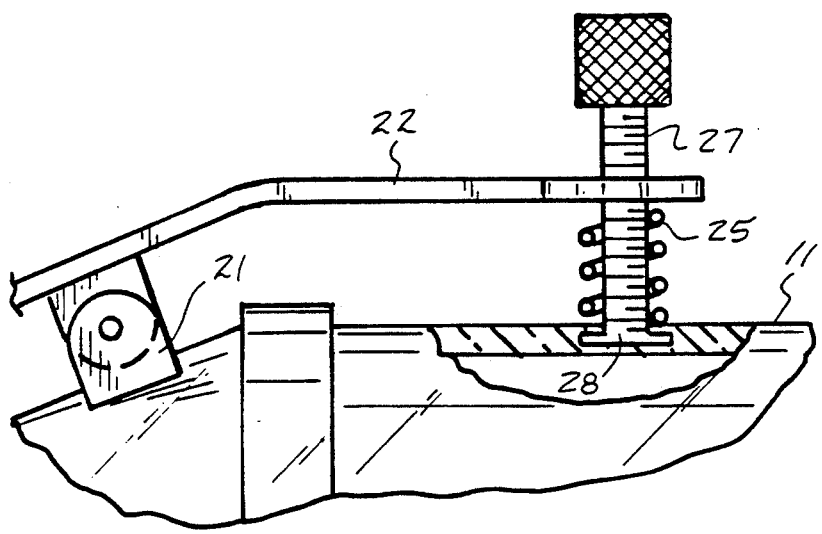
FIG. 8 is an orthographic view, taken along the lines 8—8 of FIG. 7 in the direction indicated by the arrows.

The actuator lever 22, as indicated in FIG. 8, is arranged to further include an externally threaded adjuster rod 27 directed through the lever spring 25, having an adjuster rod annular flange 28 rotatably mounted within the tubular body 11 in adjacency to the actuator lever first end portion. In this manner, fixed adjustment of the actuator lever, and particularly the metering flange 26 relative to the outlet opening 20, is provided.

It should be understood that the actuator rod annular flange 28 is rotatably mounted, as indicated, relative to the tubular body 11, but further permits a slight pivoting of the actuator rod 27 due to a loose inter-fitting relationship with the annular flange within the tubular body to permit slight pivoting of the actuator rod to accommodate the actuator lever as it is pivotally displaced towards and away from the tubular body 11. The degree of the loose inter-fitting relationship of the actuator rod annular flange 28 relative to the tubular body 11 is dependent upon the axial arcuate displacement desired of the actuator lever 22.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A paint applicator syringe, comprising, a tubular body, the tubular body having an externally threaded first end portion spaced from a tubular body second end portion, with the second end portion including an annular flange projecting exteriorly of the tubular body, and a conical head, the conical head including an internally threaded skirt in secured orientation relative to the externally threaded first end portion, with the conical head further including an outlet tube, the outlet tube having an outlet opening, and a plunger rod, the plunger rod slidably directed through the tubular body, having a piston with the piston including a cylindrical seal, the cylindrical seal arranged for sealing engagement within the tubular body defining a fluid cavity between the seal and the outlet opening, and a bifurcated mount integrally secured to the conical head, and an actuator lever, the actuator lever including an actuator lever lug, the actuator lever lug received within the bifurcated mount, with an axle removably mounted through the actuator lug and the actuator lever, with the actuator lever including a first end positioned over the tubular body, and the actuator lever including a second end, with the second end having a metering flange in contiguous communication with the outlet opening, whereupon displacement of the actuator lever first end towards the tubular body effects displacement of the metering flange relative to the outlet opening, and a lever spring captured between the actuator lever first end and the tubular body, and an externally threaded adjuster rod threadedly directed through the actuator lever and the lever spring, with the adjuster rod including an adjuster rod annular flange rotatably mounted within the tubular body.

* * * * *